(12) United States Patent
Gokhale et al.

(10) Patent No.: US 8,640,457 B2
(45) Date of Patent: Feb. 4, 2014

(54) SYSTEM AND METHOD FOR OPERATING A TURBOCHARGED ENGINE

(75) Inventors: Manoj Prakash Gokhale, Bangalore (IN); Nilesh Vinayak Deshpande, Pune (IN)

(73) Assignee: General Electric Company, Niskayuna, NY (US)

( * ) Notice: Subject to any disclaimer, the term of this patent is extended or adjusted under 35 U.S.C. 154(b) by 1148 days.

(21) Appl. No.: 12/577,992

(22) Filed: Oct. 13, 2009

(65) Prior Publication Data

US 2011/0083641 A1  Apr. 14, 2011

(51) Int. Cl.
F02B 33/44 (2006.01)
F02M 25/07 (2006.01)
F02D 23/00 (2006.01)

(52) U.S. Cl.
USPC .............................. 60/605.2; 60/602; 701/108

(58) Field of Classification Search
USPC .................. 60/605.2, 600–601; 701/108, 103
IPC .. F02M 25/07; F02D 41/40,41/00, 19/06; F02B 47/08
See application file for complete search history.

(56) References Cited

U.S. PATENT DOCUMENTS

| | | | |
|---|---|---|---|
| 3,785,145 A * | 1/1974 | Amann | 60/39.52 |
| 4,131,095 A * | 12/1978 | Ouchi | 123/58.8 |
| 5,121,734 A | 6/1992 | Grieshaber et al. | 123/568.17 |
| 5,517,976 A | 5/1996 | Bächle et al. | 60/605.2 |
| 6,360,732 B1 * | 3/2002 | Bailey et al. | 60/605.2 |
| 6,543,230 B1 * | 4/2003 | Schmid | 60/605.2 |
| 6,848,300 B2 * | 2/2005 | Schmid et al. | 73/114.69 |
| 7,237,381 B2 * | 7/2007 | Kolavennu et al. | 60/605.2 |
| 7,426,922 B2 * | 9/2008 | Shimo et al. | 123/568.12 |
| 7,945,376 B2 * | 5/2011 | Geyer et al. | 701/108 |
| 8,065,878 B2 * | 11/2011 | Vuk | 60/612 |
| 8,165,779 B2 * | 4/2012 | Ostberg et al. | 701/103 |
| 8,176,736 B2 * | 5/2012 | Janssen | 60/605.2 |
| 8,302,400 B2 * | 11/2012 | Auffret et al. | 60/605.2 |
| 2006/0218920 A1 * | 10/2006 | Gokhale | 60/601 |
| 2008/0216475 A1 | 9/2008 | Kasper et al. | 60/605.2 |
| 2008/0264081 A1 * | 10/2008 | Crowell et al. | 62/132 |
| 2009/0063023 A1 * | 3/2009 | Nagae | 60/605.2 |
| 2009/0199825 A1 * | 8/2009 | Piper et al. | 60/605.2 |
| 2009/0255251 A1 * | 10/2009 | Paffrath | 60/605.2 |
| 2010/0064685 A1 * | 3/2010 | Auffret et al. | 60/605.2 |
| 2010/0077747 A1 * | 4/2010 | Pierpont et al. | 60/605.2 |

(Continued)

FOREIGN PATENT DOCUMENTS

EP 620365 A1 * 10/1994 ............. F02M 25/07
EP 1186767 A2 * 3/2002 ............. F02M 25/07

(Continued)

*Primary Examiner* — Thai Ba Trieu
(74) *Attorney, Agent, or Firm* — Joseph J. Christian

(57) ABSTRACT

A method includes substantially reducing specific fuel consumption and exhaust emissions of an engine by adjusting an exhaust flow from a set of predetermined cylinders among a plurality of cylinders of the engine through an exhaust gas recirculation system to an intake manifold, by adjusting a temperature of a cooler of the exhaust gas recirculation system, and by adjusting a fuel injection timing, in response to variance in a plurality of parameters of the engine.

12 Claims, 5 Drawing Sheets

(56) References Cited

U.S. PATENT DOCUMENTS

| | | | |
|---|---|---|---|
| 2010/0082222 A1* | 4/2010 | Alark et al. | 701/103 |
| 2010/0146967 A1* | 6/2010 | Simpson et al. | 60/605.2 |
| 2010/0268442 A1* | 10/2010 | Kabashima et al. | 701/103 |
| 2010/0287911 A1* | 11/2010 | Katsuki et al. | 60/295 |
| 2011/0088391 A1* | 4/2011 | Sumser et al. | 60/602 |
| 2011/0094224 A1* | 4/2011 | Sheidler et al. | 60/605.2 |
| 2011/0094485 A1* | 4/2011 | Vuk et al. | 60/605.2 |
| 2011/0131979 A1* | 6/2011 | Ryan et al. | 60/605.2 |
| 2012/0255298 A1* | 10/2012 | Auffret et al. | 60/605.2 |

FOREIGN PATENT DOCUMENTS

| | | | | |
|---|---|---|---|---|
| EP | 1398483 A2 * | 3/2004 | | F02D 41/14 |
| JP | 2010133640 A * | 6/2010 | | F02B 27/02 |
| WO | 01/11217 A1 | 2/2001 | | F02M 25/07 |
| WO | WO 2006104798 A1 * | 10/2006 | | F02D 41/30 |
| WO | WO 2007008196 A1 * | 1/2007 | | F02B 47/08 |
| WO | WO 2008062254 A1 * | 5/2008 | | F02M 25/07 |
| WO | WO 2008062315 A3 * | 7/2008 | | F02M 25/07 |

\* cited by examiner

SYSTEM AND METHOD FOR OPERATING A TURBOCHARGED ENGINE

BACKGROUND

The invention relates generally to a system and method for operating a turbo-charged compression-ignition engine and, specifically, to a system and method for substantially reducing specific fuel consumption and engine exhaust emission in a turbo-charged engine. More specifically, the invention relates to a system and method for enabling a uniform exhaust gas recirculation to different cylinders in a multicylinder engine.

In a compression-ignition engine, such as a diesel engine, a fuel injection system injects fuel (e.g. diesel fuel) into compressed air within each of the engine cylinders to create an air-fuel mixture that ignites due to the heat and pressure of compression. Unfortunately, engine efficiency, power output, fuel consumption, exhaust emissions, and other operational characteristics are less than ideal. In addition, conventional techniques to improve one operational characteristic often worsen one or more other operational characteristic. For example, attempts to decrease specific fuel consumption often cause increases in various exhaust emissions. Vehicle exhaust emissions include pollutants such as carbon monoxide, nitrogen oxides (NOx), particulate matter (PM), and smoke generated due to incomplete combustion of fuel within the combustion chamber. The amount of these pollutants varies depending on the fuel-air mixture, compression ratio, injection timing, ambient conditions, and so forth.

Stringent emission regulations have forced emissions from engines to reduce over the years. One of the emissions of concern is nitrogen oxide (NOx) emissions. Exhaust gas recirculation is one of the potential ways to achieve low NOx emission levels. Exhaust gas recirculation involves pumping a fraction of exhaust gas into an air intake manifold, which is at a higher pressure than an exhaust manifold pressure. As a result, exhaust gas recirculation requires a means for pumping the exhaust gas into the intake manifold. Conventionally means for pumping may include convergent nozzles (venturies) and externally driven pumps/blowers. The usage of additional components for recirculation of exhaust gas increases specific fuel consumption (SFC) of the engine. Also, conventional exhaust gas recirculation systems do not enable a uniform exhaust gas recirculation to different cylinders in a multicylinder engine.

It is desirable to have a system and method that enable a uniform exhaust gas recirculation to different cylinders in a multicylinder engine and also substantially reduces specific fuel consumption and engine exhaust emission in a turbo-charged engine.

BRIEF DESCRIPTION

In accordance with one exemplary embodiment of the present invention, a method of operating a turbocharged system is disclosed. The method includes substantially reducing specific fuel consumption and exhaust emissions of an engine by adjusting an exhaust flow from a set of predetermined cylinders among a plurality of cylinders of the engine through an exhaust gas recirculation system to an intake manifold, by adjusting a temperature of a cooler of the exhaust gas recirculation system, and by adjusting a fuel injection timing, in response to variance in a plurality of parameters. The parameters include a quantity of exhaust emissions, a maximum in-cylinder pressure of the engine, an engine load, an engine notch, engine speed, a percentage of exhaust gas recirculation through the exhaust gas recirculation system, a sulfur content in a fuel, a fuel injection pressure, or combinations of the parameters thereof.

In accordance with another exemplary embodiment of the present invention, a method for controlling a percentage of exhaust gas recirculation in a turbocharged system is disclosed. The method includes directing one portion of an exhaust flow from a set of predetermined cylinders among a plurality of cylinders of the engine through an exhaust gas recirculation system to an intake manifold of an engine. The method also includes directing another portion of the exhaust flow from the set of predetermined cylinders among the plurality of cylinders of the engine through an exhaust gas recirculation system to an exhaust manifold of the engine. The percentage of the other portion of the exhaust flow is controlled as a function of pressure ratio of a turboexpander of the exhaust gas recirculation system, speed of the turboexpander, or combinations thereof so as to substantially reducing specific fuel consumption and exhaust emissions of the engine.

In accordance with another exemplary embodiment of the present invention, a system having a controller configured to substantially reduce specific fuel consumption and exhaust emissions of an engine is disclosed.

In accordance with another exemplary embodiment of the present invention, a system for controlling a percentage of exhaust gas recirculation in a turbocharged system is disclosed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In accordance with the exemplary embodiments disclosed herein, a system and method of operating a turbocharged system is disclosed. The method includes substantially reducing specific fuel consumption and exhaust emissions of an engine by adjusting an exhaust flow from a set of predetermined cylinders among a plurality of cylinders of the engine through an exhaust gas recirculation system to an intake manifold, by adjusting a temperature of a cooler of the exhaust gas recirculation system, and by adjusting a fuel injection timing, in response to variance in a plurality of parameters. The parameters include a quantity of exhaust emissions, a maximum in-cylinder pressure of the engine, an engine load, an engine notch, engine speed, a percentage of exhaust gas recirculation through the exhaust gas recirculation system, a sulfur content in a fuel, a fuel injection pressure, or combinations of the parameters thereof.

Figure 1:
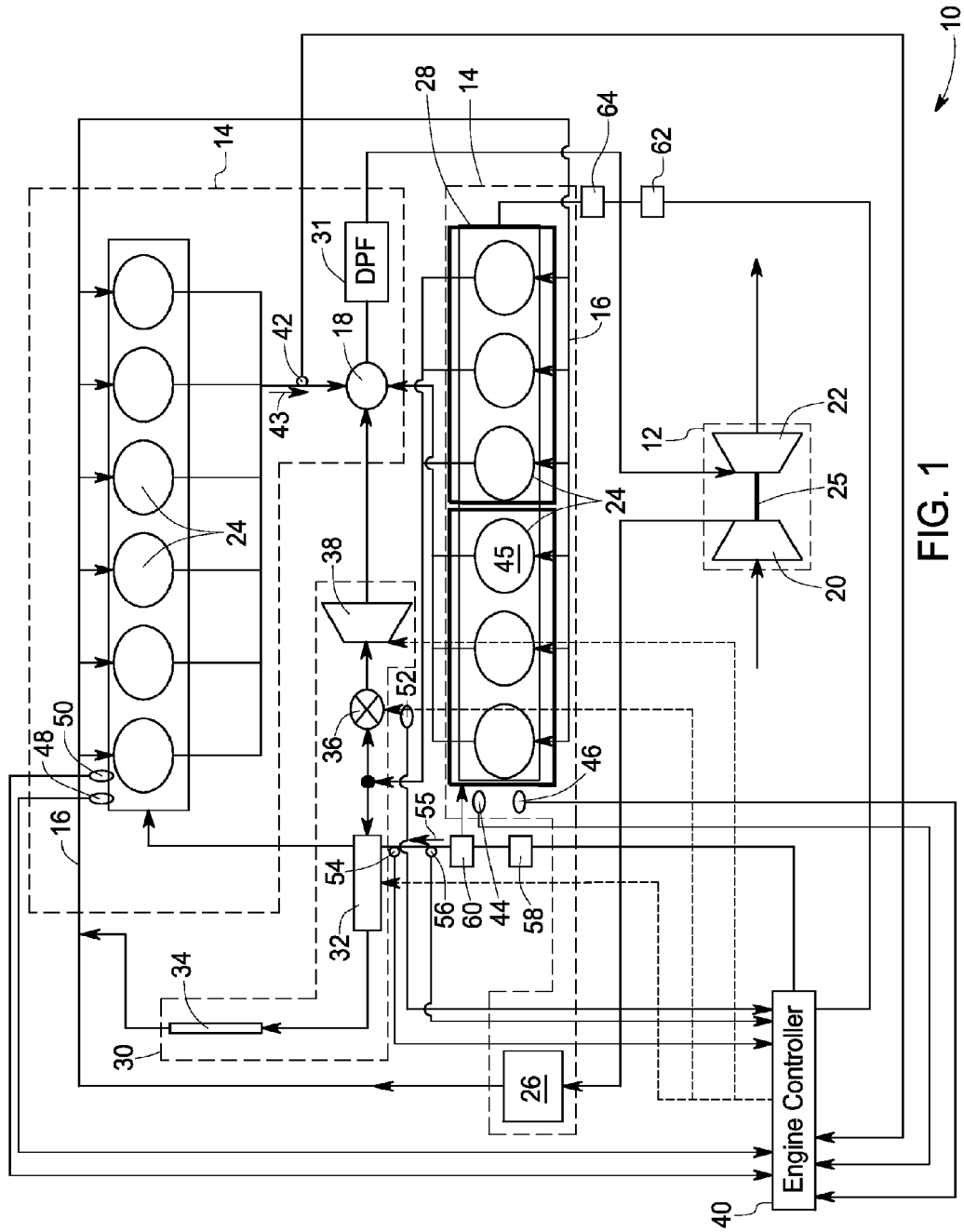
FIG. 1 is a diagrammatical representation of a turbocharged engine, having exhaust emissions and specific fuel consumption control features in accordance with an exemplary embodiment of the present technique.

Referring to FIG. 1, a turbocharged engine system 10 having specific fuel consumption and exhaust emission control features is illustrated in accordance with certain embodiments of the present technique. The turbocharged engine system 10 includes a turbocharger 12 and a compression-ignition engine, e.g. diesel engine 14. As discussed in further detail below, embodiments of the present technique provide monitoring and control features, such as sensors and control logic to control specific fuel consumption, exhaust emissions of the turbocharged engine system 10. For example, during conditions such as when there is increase in percentage of exhaust gas recirculation, specific fuel consumption and exhaust emissions are reduced to acceptable/desirable levels through one or more control techniques discussed below.

The illustrated engine 14 includes an air intake manifold 16 and an exhaust manifold 18. The turbocharger 12 includes a compressor 20 and a turbine 22 and is operated to supply compressed air to the intake manifold 16 for combustion within a plurality of cylinders 24. The turbine 22 is coupled to the exhaust manifold 18, such that the exhaust gases expand through the turbine 22, putting work onto and rotating a turbocharger shaft 25 coupled to the compressor 20. The compressor 20 draws ambient air through a filter (not shown) and provides compressed air to a heat exchanger 26. The temperature of air is increased due to compression through the compressor 20. The compressed air flows through the heat exchanger 26 such that the temperature of air is reduced prior to delivery into the intake manifold 16 of the engine 14. In one embodiment, the heat exchanger 26 is an air-to-water heat exchanger, which utilizes a coolant to facilitate removal of heat from the compressed air. In another embodiment, the heat exchanger 26 is an air-to-air heat exchanger, which utilize ambient air to facilitate removal of heat from compressed air.

In the illustrated embodiment, one set of cylinders 24, for example three cylinders form a group 28 and may also be referred to as "spender cylinders. Exhaust gases from the group of spender cylinders 28 is recirculated and mixed with airflow from the heat exchanger 26 via an exhaust gas recirculation system 30. Specifically, exhaust gases from the group of spender cylinders 28 is recirculated via an exhaust gas recirculation cooler 32 and a connection pipe 34 to the intake manifold 16 of the engine 14. A diesel particulate filter (DPF) 31 is used to filter the particulate matter in the engine exhaust emissions. The choice of the spender cylinders is determined based upon firing order of the engine 14. The exhaust gas pulses from the group of spender cylinders 28 are phased in such a way so as to provide continuous supply of exhaust gas to the intake manifold 16 via the exhaust gas recirculation cooler 32 and the connection pipe 34. The length of the connection pipe 34 is designed in such a way so as to enable uniform distribution of exhaust gas to the cylinders. The length of the connection pipe is in the range of 3.5 meters to 5 meters.

The exhaust gas recirculation system 30 also includes a bleed loop having an exhaust gas recirculation valve 36 and a turbo expander 38 disposed downstream of the valve 36. The exhaust gas recirculation valve 36 and the turbo expander 38 are configured to vary the exhaust gas recirculation rate to the intake manifold 16. In the illustrated embodiment, the exhaust gas from the group of spender cylinders 28 is divided into an exhaust gas recirculation stream and a bleed stream. The exhaust gas recirculation stream is fed through the cooler 32 and the pipe 34 to the intake manifold 16. The bleed stream is fed through the valve 36 and the turboexpander 38 to the stream of exhaust gas from the other cylinders 24. The speed of the turboexpander 38 is controlled to vary the flow rate of the exhaust gas recirculation stream. The functioning of the system 30 is explained in greater detail with reference to subsequent figures.

The system 10 also includes an engine controller 40. In one embodiment, the controller 40 is an electronic logic controller that is programmable by a user. In the illustrated embodiment, a plurality of sensors including an emission sensor 42, a cylinder pressure sensor 44, a load sensor 46, a notch sensor 48, a speed sensor 50, an exhaust gas recirculation sensor 52, sulfur sensor 54, and an injection pressure sensor 56 coupled to the controller 40 and configured to measure quantity of the exhaust emissions 43, the maximum in-cylinder pressure 45 of the engine 14, engine load, engine notch, engine speed, a percentage of exhaust gas recirculation through the system 30, sulfur content 55 in the fuel, and fuel injection pressure respectively. The controller 40 receives the corresponding output signals from the plurality of sensors 42, 44, 46, 48, 50, 52, 54, 56.

In one embodiment, the controller 40 is an electronic fuel injection controller for the engine 14. The controller 40 is operable to produce a timing signal to control operation of a plurality of fuel injection pumps 58. The pumps 58 drive a plurality of fuel injectors 60 for injecting fuel into the plurality of cylinders 24 of the engine 14. A piston (not shown) is slidably disposed in each cylinder 24 and reciprocates between a top dead center and a bottom dead center position. In the illustrated embodiment, the controller 40 is operable to produce another timing signal to control operation of a plurality of fuel injection pumps 62. The pumps 62 drive a plurality of fuel injectors 64 for injecting fuel into the group of spender cylinders 28 of the engine 14.

The controller 40 receives corresponding output signals from the sensors 42, 44, 46, 48, 50, 52, 54, 56 and is operable to produce output signals to control a temperature of the cooler 32, the exhaust gas recirculation valve 36, speed of the turbo-expander 38, fuel injection timing of the injectors 60, 64, a fuel injection pressure, or a combination thereof. In one embodiment, the controller 40 substantially reduces specific fuel consumption and exhaust emissions of the engine 14 by adjusting an exhaust flow from a set of predetermined cylinders among the plurality of cylinders 24 of the engine 14 through the exhaust has recirculation system 30 to the manifold 16, by adjusting a temperature of the cooler 32 of the exhaust gas recirculation system 30, and by adjusting the fuel injection timing, in response to variance in parameters comprising the quantity of exhaust emissions 43, the maximum in-cylinder pressure 45 of the engine 14, and the sulfur content 55 in the fuel.

In the illustrated embodiment, the controller 40 may further include a database, an algorithm, and a data analysis block (not shown). The database may be configured to store predefined information about the system 10. For example, the database may store information relating to emissions 43 of the engine 14, in-cylinder pressure 45, engine load, engine speed, engine notch conditions, fuel sulfur content 55, fuel injection pressure, or the like. Furthermore, the database may be configured to store actual sensed/detected information from the above-mentioned sensors 42, 44, 46, 48, 50, 52, 54, 56. The algorithm facilitates the processing of signals from the above-mentioned plurality of sensors 42, 44, 46, 48, 50, 52, 54, and 56.

The data analysis block may include a range of circuitry types, such as a microprocessor, a programmable logic controller, a logic module, etc. The data analysis block in combination with the algorithm may be used to perform the various computational operations relating to determination of the amount of engine emissions 43, maximum in-cylinder pressure 45, engine load, engine speed, engine notch conditions, fuel sulfur content 55, fuel injection pressure, or the like. The controller 40 is configured to substantially reduce specific fuel consumption and exhaust emissions of the engine 14 by controlling a temperature of the cooler 32, the exhaust gas recirculation valve 36, speed of the turbo-expander 38, fuel injection timing of the injectors 60, 64, a fuel injection pressure, or by adjusting a combination thereof in response to variance in the plurality of parameters discussed above.

Figure 2:
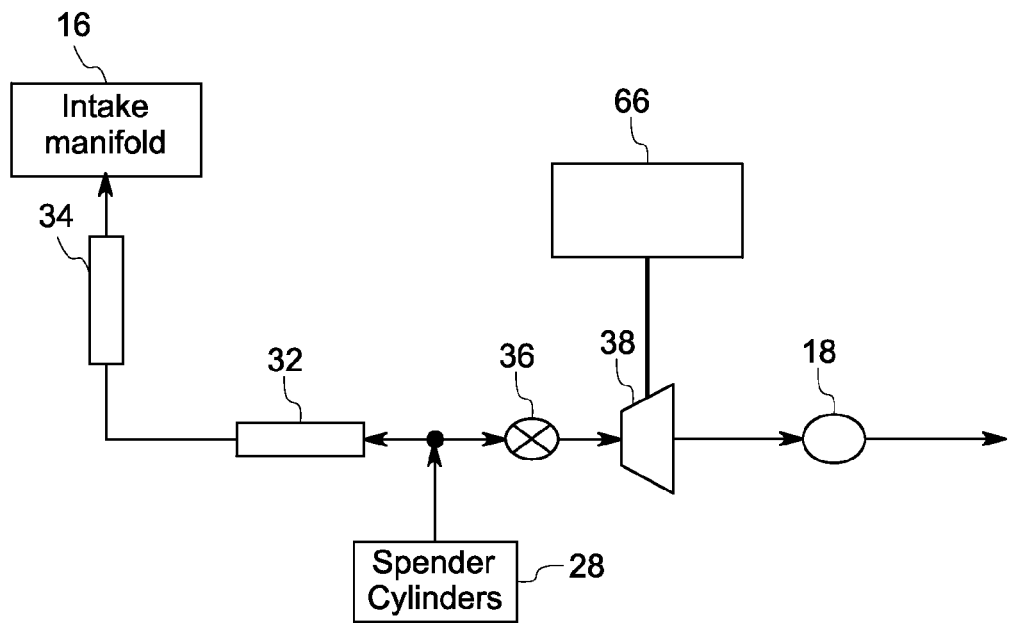
FIG. 2 is a diagrammatical representation of an exhaust gas recirculation system for a turbocharged engine in accordance with an exemplary embodiment of the present technique.

Referring to FIG. 2, an exhaust gas recirculation system 30 in accordance with the embodiment of FIG. 1 is disclosed. As disclosed previously, exhaust gases from the group of spender cylinders 28 is recirculated via the exhaust gas recirculation cooler 32 and the connection pipe 34 to the intake manifold 16 of the engine. The exhaust gas recirculation system 30 also includes the bleed loop having the exhaust gas recirculation valve 36 and the turbo expander 38 disposed downstream of the valve 36. The exhaust gas from the group of spender cylinders 28 is divided into an exhaust gas recirculation stream and a bleed stream. The exhaust gas recirculation stream is fed through the cooler 32 and the pipe 34 to the intake manifold 16. The bleed stream is fed through the valve 36 and the turboexpander 38 to the stream of exhaust gas from the other cylinders 24.

In the illustrated embodiment, the turboexpander 38 is coupled to an alternator 66. The speed of the turboexpander 38 is controlled via the alternator 66 to vary the flow rate of the exhaust gas recirculation stream through the cooler 32 and the pipe 34 to the intake manifold 16. The exhaust gas stream passes through the turboexpander 38 producing electric power and is merged with the exhaust gas stream from the other cylinders 24. This extraction of additional power also facilitates to reduce the specific fuel consumption. The exhaust gas recirculation pressure pulses are matched with the intake manifold pressure pulses so as to achieve uniform exhaust gas recirculation distribution to the engine cylinders.

Figure 3:
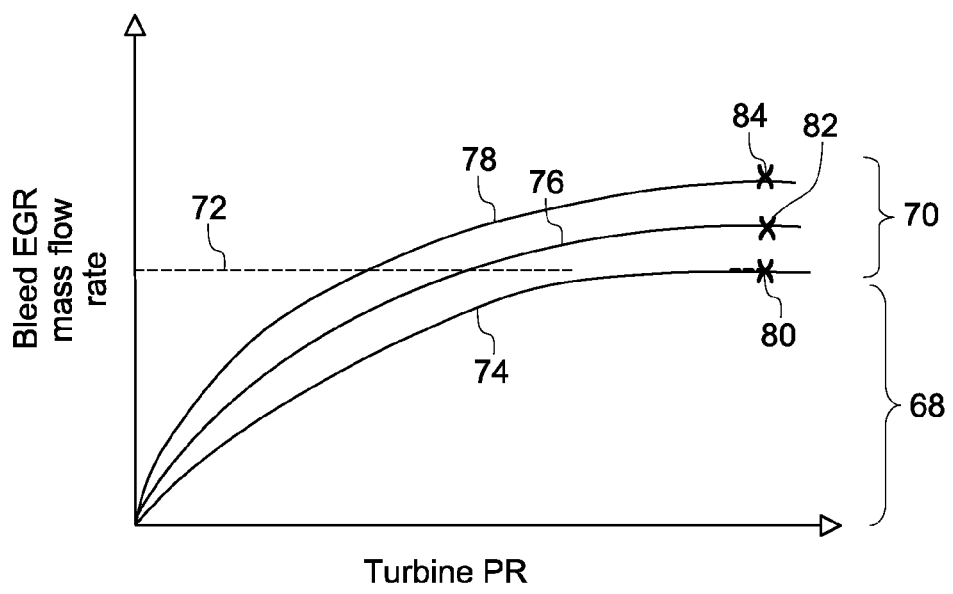
FIG. 3 is a graph representing variation of exhaust gas mass flow rate (Y-axis) and turboexpander pressure ratio (X-axis) in accordance with an exemplary embodiment of the present technique.

Referring to FIG. 3, a graph representing variation of exhaust gas mass flow rate (Y-axis) and turboexpander pressure ratio (X-axis). In other words, the graph represents turboexpander characteristics for variable exhaust gas recirculation rate. A region indicated by the reference numeral 68 represents exhaust gas recirculation mass flow rate control via the cooler using the exhaust gas recirculation valve. A region indicated by the reference numeral 70 represents exhaust gas recirculation mass flow rate control via the cooler using the turboexpander. The dotted line indicated by the reference numeral 72 represents exhaust gas mass flow rate through the bleed loop at a predetermined maximum speed (runaway speed) of the turboexpander. Lines 74, 76, 78 represent exhaust gas recirculation rate through the cooler. Points 80, 82, 84 represent turboexpander speed.

The exhaust gas flow rate through the bleed loop can be varied only up to a predetermined maximum flow rate corresponding to the runaway speed of the turboexpander by varying the alternator speed. As the speed of the turbo-expander is reduced from point 80 to point 84 via the alternator, the exhaust gas flow rate through the bleed loop is increased resulting in reduced exhaust gas recirculation to the engine. In order to reduce the exhaust flow recirculation to the engine beyond point 80, the turboexpander speed may be set to the runaway speed and the exhaust gas flow through the bleed loop is controlled via the exhaust gas recirculation valve.

Figure 4:
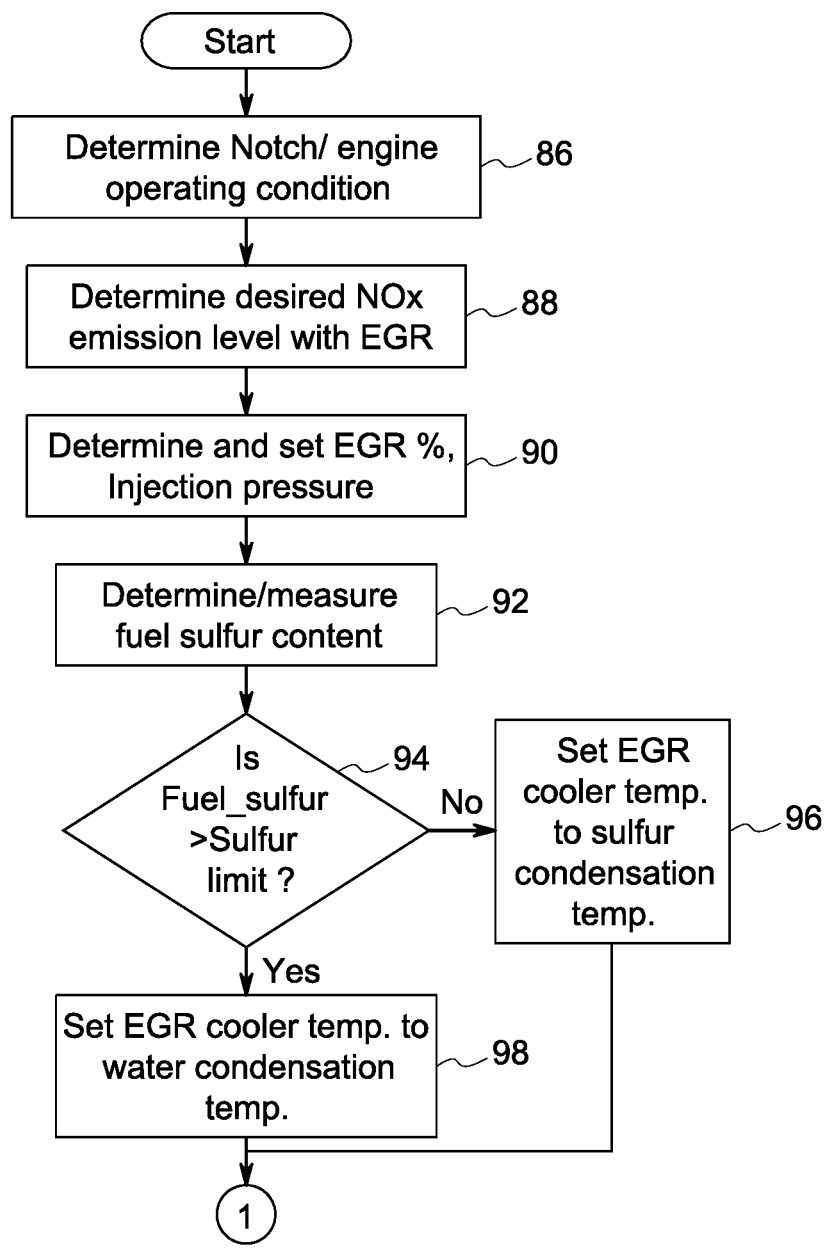
FIG. 4 is a flow chart illustrating exemplary steps involved in the control operation of the engine controller of a turbocharged engine in accordance with an exemplary embodiment of the present technique.

Referring to FIG. 4, a flow chart illustrating exemplary steps involved in the control operation of the engine controller is disclosed. The method involves determining engine notch, engine load, and engine speed via the notch sensor 48, the load sensor 46, and the speed sensor 50 respectively as represented by the step 86. The quantity of exhaust emissions (e.g. nitrogen oxide (NOX) emissions, particulate matter, or the like) is determined via the emission sensor 42 as represented by the step 88. The percentage of exhaust gas recirculation and injection pressure are determined via the exhaust gas recirculation sensor 52 and pressure sensor 56 respectively as represented by the step 90. The quantity of sulfur content in the fuel is determined/measured via the sulfur sensor 54 as represented by the step 92. The engine controller 40 receives corresponding output signals from the sensors 42, 46, 48, 50, 52, 56, 54 and is operable to produce output signals to perform the various control operations as discussed below.

The method further includes comparing a quantity of measured sulfur content (fuel_sulfur) in the fuel to a predetermined quantity of sulfur content (sulfur_limit) as represented by the step 94. When the quantity of measured sulfur content (fuel_sulfur) in the fuel is less than the predetermined quantity of sulfur content (sulfur_limit), the controller 40 sets the temperature of the cooler 32 of the exhaust gas recirculation system 30 to a sulfur condensation temperature as represented by the step 96. When the quantity of measured sulfur content (fuel_sulfur) in the fuel is greater than the predetermined quantity of sulfur content (sulfur_limit), the controller 40 sets the temperature of the cooler 32 of the exhaust gas recirculation system 30 to a water condensation temperature as represented by the step 98. It should be noted herein that the cooler temperature is set as a function of sulfur content in the fuel.

Figure 5:
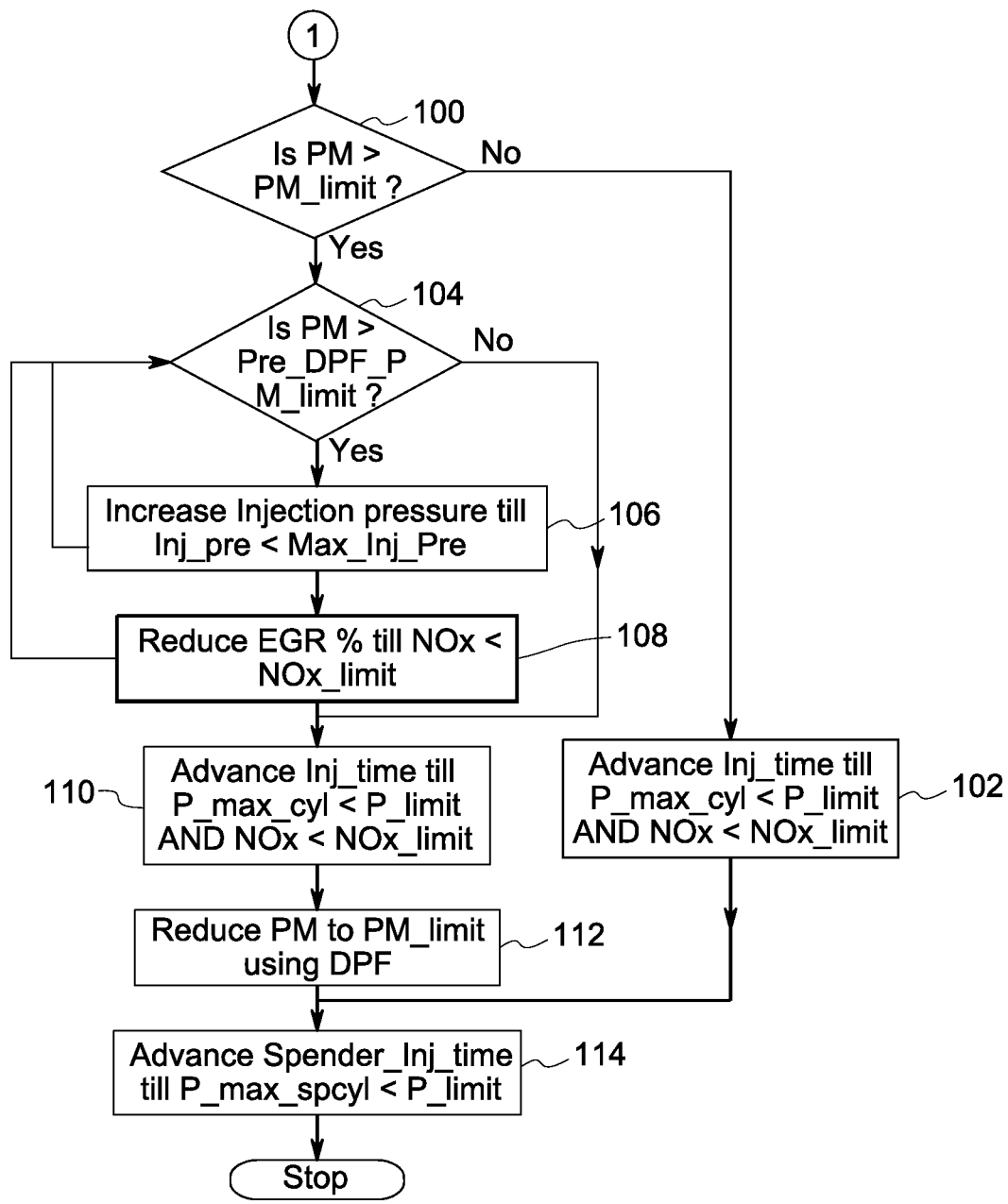
FIG. 5 is a flow chart illustrating exemplary steps involved in the control operation of the engine controller of a turbocharged engine in accordance with the exemplary embodiment of FIG. 4.

Referring to FIG. 5, a flow chart illustrating exemplary steps involved in the control operation of the engine controller in accordance with embodiment of FIG. 4 is disclosed. The method also includes comparing a quantity of measured particulate matter (PM) in the exhaust emissions to a predetermined quantity of particulate matter (PM_limit) as represented by the step 100. The controller 40 advances the fuel injection timing (inj_time) to substantially reduce specific fuel consumption until a measured maximum in-cylinder pressure (P_max_cyl) of the engine is below a predetermined maximum in-cylinder pressure (P_limit) and a quantity of measured nitrogen oxide emissions (NOX) is below a predetermined quantity of nitrogen oxide emissions (NOX_limit) when the quantity of measured particulate matter (PM) in the exhaust emissions is less than the predetermined quantity of particulate matter (PM_limit) as represented by the step 102. The controller 40 is operable to produce an advance timing signal to control operation of the plurality of fuel injection pumps 58. The pumps 58 drive the plurality of fuel injectors 60 for injecting fuel into the plurality of cylinders 24 of the engine 14.

The method further includes comparing the quantity of measured particulate matter (PM) in the exhaust emissions to a predetermined limit of particulate matter (Pre_DPF_PM_limit) that can be filtered through a diesel particulate filter as represented by the step 104, when the quantity of measured particulate matter (PM) in the exhaust emissions is greater than the predetermined quantity of particulate matter (PM_limit) that can be filtered through the diesel particulate filter as represented by the step 100. The controller 40 increases a measured fuel injection pressure (inj_pre) upto a predetermined fuel injection pressure (Max_inj_pre) when the quantity of measured particulate matter (PM) in the exhaust emissions is greater than the predetermined quantity of particulate matter (Pre_DPF_PM_limit) that can be filtered through the diesel particulate filter so as to control the quantity of measured particulate matter (PM) in the exhaust emissions to below the predetermined quantity of particulate matter (Pre_DPF_PM_limit) that can be filtered through the diesel particulate filter as represented by the step 106. The controller 40 also reduces the percentage of exhaust gas recirculation through the exhaust gas recirculation system 30 to reduce the particulate matter (PM) in the exhaust emissions until a quantity of measured nitrogen oxide emissions (NOX) is below a predetermined quantity of nitrogen oxide emissions (NOX_limit) as represented by the step 108.

The controller 40 also advances the fuel injection timing to substantially reduce specific fuel consumption until a measured maximum in-cylinder pressure (P_max_cyl) of the engine is below a predetermined maximum in-cylinder pressure (P_limit) and a quantity of measured nitrogen oxide emissions (NOX) is below a predetermined quantity of nitrogen oxide emissions (NOX_limit) when the quantity of measured particulate matter (PM) in the exhaust emissions is less than the predetermined quantity of particulate matter (Pre_DPF_PM_limit) that can be filtered through the diesel particulate filter as represented by the step 110.

The controller 40 reduces the quantity of measured particulate matter (PM) to below a predetermined quantity of particulate matter (PM_limit) through the diesel particulate filter as represented by the step 112. The controller also advances a fuel injection timing of the set of predetermined cylinders to substantially reduce the specific fuel consumption until a maximum in-cylinder pressure (P_max_spcyl) of the set of predetermined cylinders to below a predetermined maximum in-cylinder pressure (P_limit) as represented by the step 114. Advancing the fuel injection timing in the group of spender cylinders 28 facilitates to minimize specific fuel consumption and reduce spender cylinder exhaust gas temperature. As a result, the exhaust gas recirculation cooling load of the cooler 32 is reduced.

Figure 6:
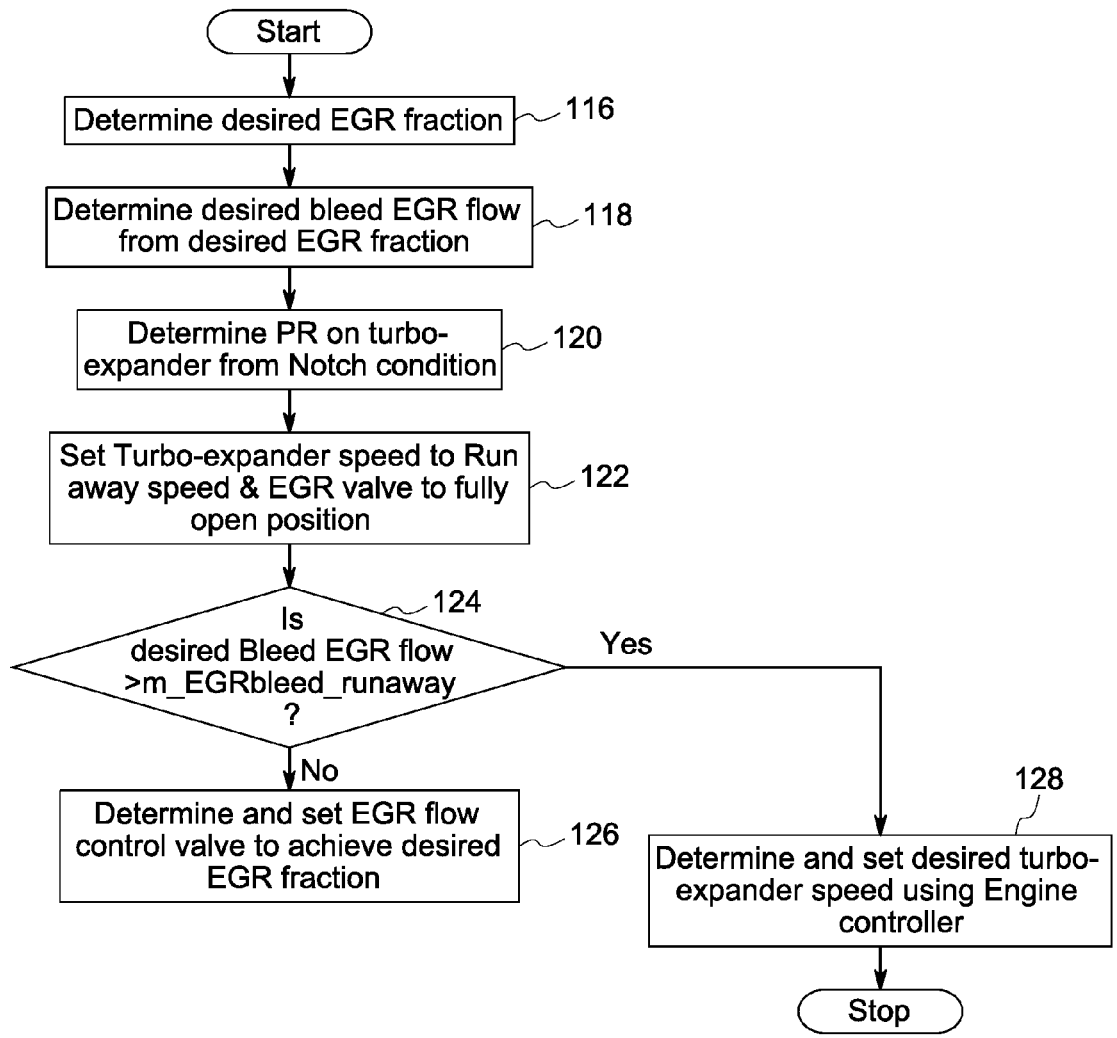
FIG. 6 is flow chart illustrating exemplary steps involved in method for controlling a percentage of exhaust gas recirculation in accordance with an exemplary embodiment of the present technique.

Referring to FIG. 6, a flow chart illustrating exemplary steps involved in method for controlling a percentage of exhaust gas recirculation via the engine controller 40 is disclosed. The method involves determining a desired percentage of exhaust gas recirculation through the exhaust gas recirculation cooler 32 to the intake manifold 16 such that quantity of measured nitrogen oxide emissions (NOX) is below a predetermined quantity of nitrogen oxide emissions (NOX_limit) as represented by the step 116. The step 116 is similar to the step 108 discussed with reference to FIG. 4. A desired exhaust gas mass flow through the bleed loop is determined based on the desired exhaust gas recirculation as represented by the step 118. As discussed previously, the bleed loop includes the exhaust gas recirculation valve 36 and the turboexpander 38 disposed downstream of the valve 36. The exhaust gas from the group of spender cylinders 28 is divided into an exhaust gas recirculation stream and a bleed stream. The exhaust gas recirculation stream is fed through the cooler 32 and the pipe 34 to the intake manifold 16. The bleed stream is fed through the valve 36 and the turboexpander 38 to the stream of exhaust gas from the other cylinders 24.

The method also includes determining pressure ratio (PR) of the turboexpander 38 based on the engine notch condition as represented by the step 120. It should be noted herein that the exhaust gas flow rate through the bleed loop can be varied only up to a predetermined maximum flow rate corresponding to the runaway speed of the turboexpander 38 by varying the alternator speed. The controller 40 sets the turboexpander speed to the runaway speed and the valve 36 to a "fully open position" as represented by the step 122. The desired exhaust gas mass flow through the bleed loop is compared to a measured mass flow of exhaust gas through the bleed loop at runaway speed of the turboexpander 38 as represented by the step 124. The controller 40 sets the speed of the turboexpander 38 to a predetermined speed when the desired exhaust gas mass flow through the bleed loop is greater than the measured mass flow of exhaust gas through the bleed loop at runaway speed of the turboexpander 38 as represented by step 128. When the desired exhaust gas mass flow through the bleed loop is less than the measured mass flow of exhaust gas through the bleed loop at runaway speed of the turboexpander 38, the controller 40 controls the valve 36 to achieve the desired percentage of exhaust gas recirculation through the exhaust gas recirculation cooler 32 to the intake manifold 16 as represented by step 126.

The embodiments discussed herein with reference to FIGS. 1-5 enable meeting required emission standards without requirement of additional components for pumping exhaust gas into the intake manifold 16. As a result, specific fuel consumption is also reduced compared to conventional systems using pumping system for recirculation of exhaust gas. The exemplary system and method also enable a uniform exhaust gas distribution to different cylinders of the turbocharged engine.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling a percentage of exhaust gas recirculation in a turbocharged engine system, comprising:
controlling an exhaust gas recirculation valve to:
direct one portion of an exhaust flow from a set of predetermined cylinders among a plurality of cylinders of the engine through an exhaust gas recirculation system to an intake manifold of an engine;
direct another portion of the exhaust flow from the set of predetermined cylinders among the plurality of cylinders of the engine through an exhaust gas recirculation system to an exhaust manifold of the engine;
wherein a percentage of the other portion of the exhaust flow through the exhaust gas recirculation system is controlled via a controller as a function of pressure ratio of a turboexpander of the exhaust gas recirculation system, speed of the turboexpander, or combinations thereof detected via sensors.

2. The method of claim 1, further comprising determining a desired quantity of the one portion of the exhaust flow and determining a desired quantity of the other portion of the exhaust flow based on the desired quantity of the one portion of the exhaust flow.

3. The method of claim 2, further comprising determining the pressure ratio of the turboexpander based on an engine notch.

4. The method of claim 2, further comprising setting the speed of the turboexpander to a predetermined speed and holding an exhaust gas recirculation valve of the exhaust gas recirculation system in a fully open position.

5. The method of claim 4, further comprising comparing the desired quantity of the other portion of the exhaust flow to a measured quantity of the other portion of the exhaust flow at the predetermined speed of the turboexpander.

6. The method of claim 5, further comprising setting the speed of the turboexpander to a predetermined speed when the desired quantity of the other portion of the exhaust flow is greater than the measured quantity of the other portion of the exhaust flow at the predetermined speed of the turboexpander.

7. The method of claim 5, further comprising controlling the exhaust gas recirculation valve to obtain the desired quantity of the one portion of the exhaust flow when the desired quantity of the other portion of the exhaust flow is less than the measured quantity of the other portion of the exhaust flow at the predetermined speed of the turboexpander.

8. A turbocharged engine system, comprising:
a controller coupled to an engine and an exhaust gas recirculation system,
wherein the controller controls an exhaust gas recirculation valve to:
direct one portion of an exhaust flow from a set of predetermined cylinders among a plurality of cylinders of the engine through the exhaust gas recirculation system to an intake manifold of the engine; and
direct another portion of the exhaust flow from the set of predetermined cylinders among the plurality of cylinders of the engine through the exhaust gas recirculation system to an exhaust manifold of the engine, wherein the controller is configured to control percentage of the other portion of the exhaust flow through the exhaust gas recirculation system as a function of pressure ratio of a turboexpander of the exhaust gas recirculation system, speed of the turboexpander, or combinations thereof detected via sensors.

9. The turbocharged engine system of claim 8, wherein the controller is configured to determine a desired quantity of the one portion of the exhaust flow and determine a desired quantity of the other portion of the exhaust flow based on the desired quantity of the one portion of the exhaust flow.

10. The turbocharged engine system of claim 9, wherein the controller is configured to compare the desired quantity of the other portion of the exhaust flow to a measured quantity of the other portion of the exhaust flow at the predetermined speed of the turboexpander.

11. The turbocharged engine system of claim 10, wherein the controller is configured to set the speed of the turboexpander to a predetermined speed when the desired quantity of the other portion of the exhaust flow is greater than the measured quantity of the other portion of the exhaust flow at the predetermined speed of the turboexpander.

12. The turbocharged engine system of claim 10, wherein the controller is configured to control the exhaust gas recirculation valve to obtain the desired quantity of the one portion of the exhaust flow when the desired quantity of the other portion of the exhaust flow is less than the measured quantity of the other portion of the exhaust flow at the predetermined speed of the turboexpander.

* * * * *